March 23, 1943.  W. L. TANCRED  2,314,637

REGISTER

Filed March 1, 1939  3 Sheets-Sheet 1

Inventor
WILLIAM L. TANCRED
By Lindsey & Robillard
Attorneys

March 23, 1943.  W. L. TANCRED  2,314,637
REGISTER
Filed March 1, 1939  3 Sheets-Sheet 2
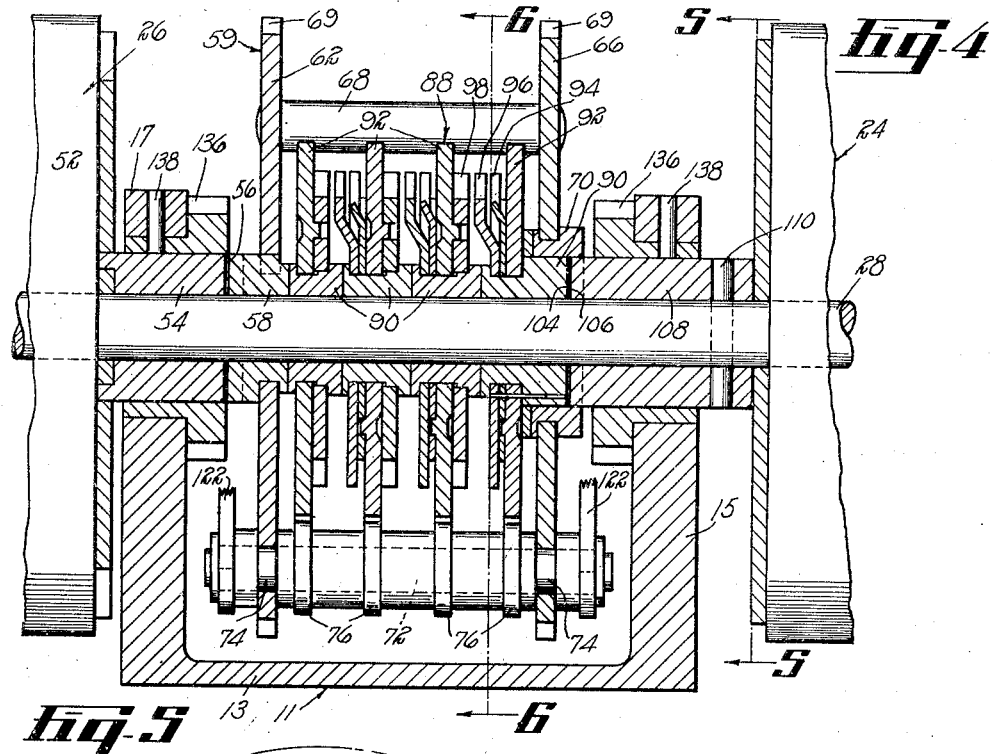
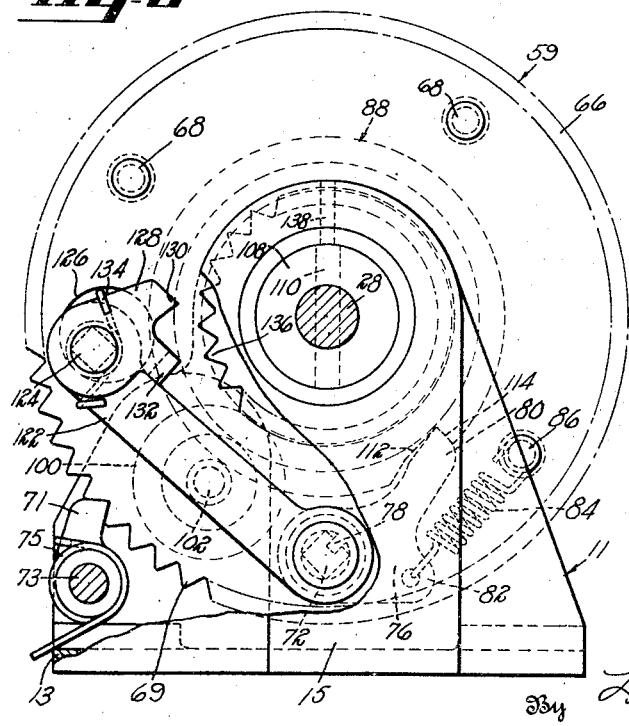
Inventor
WILLIAM L. TANCRED
By Lindsey & Robillard
Attorneys March 23, 1943. W. L. TANCRED 2,314,637
REGISTER
Filed March 1, 1939 3 Sheets-Sheet 3

Inventor
WILLIAM L. TANCRED
By Lindsey & Rabillard
Attorneys

Patented Mar. 23, 1943

2,314,637

UNITED STATES PATENT OFFICE 2,314,637

REGISTER

William L. Tancred, Hartford, Conn., assignor to Veeder-Root Incorporated, Hartford, Conn., a corporation of Connecticut Application March 1, 1939, Serial No. 259,164

11 Claims. (Cl. 235—1)

This invention relates to registers and more particularly to a register having in combination indicating means and counter and totalizing means; the indicating means being adapted to indicate the number of operations or position of movement of a device at any particular time and the counter or totalizing means to designate the highest number of operations or positions of movement previously reached by the device in one direction.

As an example of a use to which the register may be applied, reference may be had to registering of the greatest depth to which an oil drill has penetrated and the position of the drill at any time. For example, it is customary in the use of drills to have the drill penetrate to a certain depth and then be retracted a predetermined amount and then lowered again. The purpose of the present invention is to show the depth of the drill at any time, the total depth to which it has penetrated, and also to indicate the amount the drill is being withdrawn. If, for example, the register is initially set to zero and the drill penetrates to a thousand feet, the indicating means of the register will simultaneously operate to register one thousand. If then the drill is withdrawn seven hundred feet, the indicating means will reverse its operation and count back to three hundred; whereas the counter or totalizer means will remain at one thousand, and the operator will know both the position of his drill and, by simple substraction, the amount it has been withdrawn from its last previous greatest depth. If the drill is again lowered, the indicating means will again count to one thousand, and if the drill is lowered beyond that point, both the indicator and counter or totalizer will again simultaneously operate to indicate the total depth.

An aim of the present invention is to provide a register for the above-indicated purpose wherein there are provided indicating and counting or totalizer means adapted to be driven from operating means and including means automatically operable upon reverse movement of the operating means to disconnect the totalizer means and to again connect the totalizer means after said operating means has moved in a forward direction to an extent equal to its previous movement in a reverse direction.

A still further aim is a register wherein a counter is utilized for automatically making and breaking a drive connection between the operating means and counter or totalizer means at predetermined points of operation.

A further aim of the invention is to provide an improved, simplified, and inexpensive registering mechanism for the above-indicated purpose, which register comprises a relatively small number of parts, is positive in its action, economical to manufacture, and may be adapted for a plurality of uses other than that indicated.

Other objects will be in part obvious and in part pointed out more in detail hereinafter.

The invention accordingly consists in the features of construction, combination of elements, and arrangement of parts, which will be exemplified in the construction hereafter set forth and the scope of the application of which will be indicated in the appended claims.

In the accompanying drawings:

Figure 1 is a plan view of a register embodying the invention herein;

Fig. 2 is a side view of the register of Fig. 1 with the casing thereof partly in section to show the interior construction and arrangement of indicators;

Fig. 3 is a view taken on line 3—3 of Fig. 2;

Fig. 4 is a fragmentary sectional view of part of the registering mechanism;

Fig. 5 is a view taken on the line 5—5 of Fig. 4;

Figure 6:
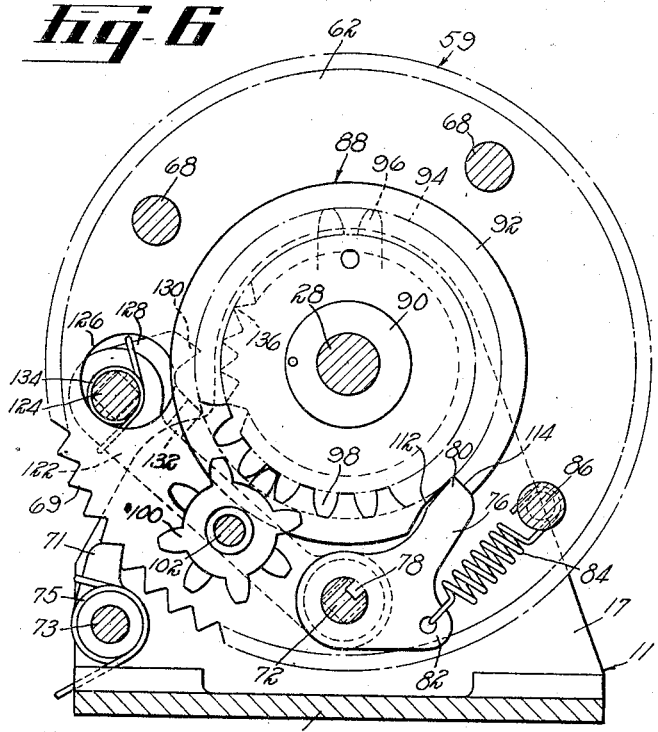
Fig. 6 is a view taken on the line 6—6 of Fig. 4, with the parts shown in position wherein both indicating means and counter means or totalizer are operating simultaneously.
Figure 7:
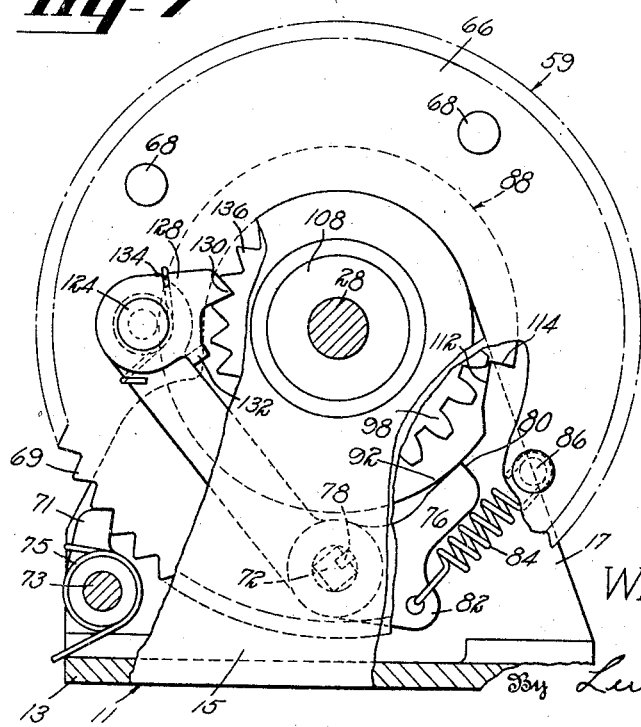
Fig. 7 is a view similar to Fig. 6, with the parts positioned when the counter or totalizer is inoperative.

Referring to the drawings, 10 designates an elongated rectangular casing having end walls 12 and 14, a base wall 16, side walls 18, and a top plate 20; the top plate being provided with suitable openings or windows 22 through which the register may be read. Positioned within the casing and centrally positioned relative to the end walls thereof by transverse bottom plate ribs 19 is a U-shaped supporting bracket 11 having a base plate 13 and upwardly extending legs 15 and 17. The bracket is secured in place by one or more screws 21 extending through apertures in the base plate of the casing and the supporting bracket, and threadably received in the latter.

Arranged within the casing are an indicator 24 and a counter or totalizer 26, each comprising a plurality of counter units operatively connected together so that upon a complete rotation of a unit of lowest order the unit of next highest order is advanced one step. The indicating totalizer means are shown as arranged in aligned relation upon operating means comprising a shaft 28 extending longitudinally of the casing. The operating shaft 28 has one end journalled in the end wall 12 and its other end journalled in the end wall 14. Said end may also be provided with an extension 30 extending outwardly from the casing, and there may be mounted thereon a suitable switch or other control means adapted to be operated after a predetermined movement of the operating shaft 28.

The indicating means 24 may be of any suitable construction; that shown being generally of a well-known type. In the present instance, the indicating means is shown as having four counter wheel units provided on their periphery with numerals from "0" to "9" and arranged on shaft 28 intermediate of end wall 12 and leg 16 of the supporting bracket 11. Each wheel carries on the face adjacent the next wheel of highest order a locking disk 34 carrying a mutilated driving gear 36 comprising two teeth with a notch therebetween adapted, once each revolution, to engage a rotatable transfer pinion 38 positioned between each pair of wheels. The transfer pinions are of usual construction, having alternate long and short teeth; the long teeth being engaged by the mutilated gear 36 and also cooperating with the locking disk 34 to prevent rotation of the transfer pinion except when same are rotated by the mutilated gear.

Each counter wheel of next highest order is provided on the side adjacent the wheel of next lowest order with the usual twenty-toothed gear 40 adapted to mesh with all of the teeth of the transfer pinion 38. The transfer pinion 38 is suitably rotatably mounted on a shaft 42 parallel to shaft 28 and having one end secured in the end wall 12 and the other secured in the leg 15 of the centrally arranged supporting bracket 11.

The lowest order counting wheel 32 of indicator 24 is also provided with a hub 44 integral with the face thereof adjacent the end wall 12, which hub is secured to the shaft 28 by a pin 29 for simultaneous rotation therewith; whereas the remaining counter wheels are freely rotatable on the shaft. Thus when shaft 28 rotates in a forward direction, the lowest order counter wheel 32 of the indicating means 24 will rotate therewith in the same direction, and, upon completing one revolution, the mutilated gear 36 thereof will rotate the transfer pinion 38 and move the second counter wheel one step in a forward direction. As the shaft continues to rotate, the count will be progressively carried step by step from the lowest to the highest counter wheel and thus increase the registrations thereof. If the shaft 28 is now operated in a reverse direction, the same operation will result, but in a reverse direction, and the indicating means will progressively decrease the count and registrations thereof.

The shaft 28 could be directly connected to the device from which the count or measurement is to be taken, but in the embodiment illustrated it is indirectly driven from a shaft 46 through a gear train 48 having a ten-to-one speed reduction ratio. The shaft 46 has one end journalled in the leg 15 of the supporting bracket 11, and the other end thereof extends through a suitable bearing 50 in the end wall 12 and connects to the device from which the indications are to be taken. If when connected to an oil drill the shaft 46 makes one revolution for each foot of depth the drill has penetrated, then the lowest order wheel 32 of the indicating means 24 will progress forwardly one step for each ten feet of depth to which the drill has penetrated and rearwardly one step for each ten feet the drill has been withdrawn; thus indicating at all times the exact position of the drill.

The counter or totalizing means 26 also comprises a plurality of counting wheels of like number and construction to those of the indicating means 24; said wheels being arranged on the shaft 28 intermediate of the end wall 14 and leg 17 of the supporting bracket 11. The wheels of the counter or totalizing means 26 are all freely rotatable on shaft 28, and the lowest counting order wheel 52 is adapted to be connected to shaft 28 through means, hereinafter described. This connection is such as to connect counter or totalizer 26 only when the registrations thereof are equalized with those of the indicating means with shaft 28 operating in a forward direction; whereas if shaft 28 rotates in a reverse direction, the driving connection between shaft 28 and the totalizing counter 26 is broken and maintained broken until the shaft 28 has again rotated in a forward direction to an extent equal to that which it has previously rotated in a reverse direction.

In order to accomplish this, the lowest order wheel 52 of the totalizing counter means 26 is provided on the face thereof adjacent the leg 17 of bracket 11 with a hub 54 having a groove 56 in the outer end thereof. Concentrically mounted and freely rotatable on shaft 28 adjacent the hub 54 is a sleeve 58 of a rotatable cage 59; said sleeve being provided with a tongue adapted to fit within the groove 56 of hub 54, whereupon the sleeve and hub will rotate simultaneously. The sleeve 58 supports and has secured in a peripheral groove therein one circular side member 62 of the cage 59. The cage 59 includes a second circular side member 66 of like construction to the first, which member is mounted and secured in a peripheral groove of sleeve 70 which is concentrically mounted for free rotation relative to the shaft 28. The side members of the cage are spaced from one another by interconnecting pins 68 having reduced heads extending through suitable apertures in the plates and then turned over to secure the plates together for unitary movement.

The peripheries of the plates 62 and 66 are provided with teeth 69 extending entirely therearound, which teeth are adapted to engage spaced apart non-back-up pawls 71 mounted on a shaft 73 which extends between the legs 15 and 17 of the bracket member 11. The non-back-up pawls are arranged to engage the cage to prevent rotation thereof in a reverse direction and are normally urged into engagement therewith by a coiled spring 75 associated with each pawl and mounted on the shaft 73, each spring 75 having its upper end hooked behind the associated pawl 71 and its lower end in engagement with the base of the bracket member.

The members 62 and 66 also carry a shaft 72 which extends therebetween and has portions 74 journalled in suitable apertures therein. The shaft 72 is offset from the center of the side members and is provided intermediate of the members 62 and 66 with a plurality of cage driving pawls 76 suitably secured to the shaft 72 for simultaneous movement therewith by a key 78; the pawls extending from the shaft in a direction opposite to the normal rotation of the cage. Each pawl is provided with an outwardly and upwardly extending finger 80 and a downward projection 82 providing an anchor for one end of a spring 84; the other end of the spring 84 being secured to a pin 86 extending between and secured in the members 62 and 66, the springs normally tending to rotate the pawls and shaft 72 in a counterclockwise direction as seen in Fig. 5 to bring each pawl into engagement with an order unit of a blind counter 88.

The blind counter comprises a plurality of order units equal in number to the counter wheels and generally of the same construction as the indicators 24 and counter 26. Each unit comprises a sleeve 90 concentric with the shaft 28 and freely rotatable thereon and having secured in a peripheral groove therein a counter disk 92 having associated therewith a locking disk 94 provided with a mutilated gear 96, and each order unit above that of the lowest order also having a twenty-toothed gear 98. Associated with the order units are the usual transfer pinions 100, which transfer pinions are supported on a shaft 102 carried between and secured in the cage end members 62 and 66 and adapted to rotate therewith.

The lowest order unit of the blind counter is arranged adjacent the leg 15 of the supporting bracket 11, and the sleeve 90 thereof terminates in a groove 104 adapted to receive the tongue 106 of a hub 108 concentric with the shaft 28 and secured thereto for simultaneous rotation therewith by a pin 110.

Thus upon rotation of the shaft 28, the lowest order unit of the counter will rotate therewith and progressively transfer the count to the other order units. However, each counting disk 92 of the counter 88 is provided on its periphery with a recessed portion 112 having a forwardly directing shoulder 114 (with relation to movement of shaft 28) adapted to engage the forward end of the pawl finger 80. The recesses are aligned when the counter is in a zero position, and, when aligned, rotation of the shaft 28 will cause the counter disks to engage the pawl fingers 80 and operate or rotate as a unit and simultaneously carry the pawls 76 therewith to rotate the cage 59 and, through the cage, the hub 54 of the lowest order wheel of the totalizing counter means 26.

However, when the shaft 28 is rotated in a reverse direction, the cage 59 is restrained against rotation by non-back-up pawls 71, whereupon the lowest order unit counter disk 92 will rotate with shaft 28 and cam the pawl finger 80 out of the recess and onto the periphery thereof and simultaneously oscillate pawl carrying shaft 72 to unlatch all of the driving pawls and thus the driving connection between shaft 28 and the counter 26 is broken and operation of the counter stops. Upon a complete rotation of the lowest order counter unit, the count will be transferred to the next highest order unit through transfer pinions 100 which remain relatively fixed when cage 59 is stationary, whereupon the counter will operate as a counting unit and continue to do so as long as the counter disk shoulders 114 are out of alignment in either direction of movement of the drive means following a reversal thereof.

However, when the shaft 28 again moves in a forward direction to the same extent it has previously moved in a reverse direction, the pawl fingers 80 will again engage within the recesses 112 of the counter disks to again interconnect the cage 59 and totalizing counter means 26 to the operating shaft 28.

In order to prevent movement of the cage 64 in a forward direction upon forward movement of the shaft after a reverse movement thereof and prior to the engagement of the pawls with the counter disk shoulders, there is carried on each outer end of the pawl supporting shaft 72 a transfer arm 122. The lower end of each arm is secured to the shaft 72 by the key 78 for simultaneous movement with the shaft upon the release of the pawls, and the upper ends of the arms rotatably receive a transfer shaft 124 which extends between and through suitably enlarged openings 126 in the end members 62 and 66.

The shaft has secured on each end thereof a pawl 128 provided with a locking tooth 130 and an abutment stop 132. The pawl 128 and shaft 124 are normally rotated to bring the abutment stop 132 into engagement with the inner face of the transfer arm 122 by a coiled spring 134 carried on shaft 124 and having one end hooked behind the rear face of transfer arm 122 and its other end hooked over the upper edge of pawl 128.

Upon movement of the pawl fingers 80 out of the recesses 112, the pawl tooth 130 of pawl 128 will be carried into engagement with a ratchet 136 concentric with the shaft 28 and non-rotatably secured in the legs of the supporting bracket 11 by a pin 138, thus restraining the cage against movement in a forward direction except when the drive is established from the counter through the driving pawls 76.

With the foregoing construction, the register is normally set with the indicating means 24 and the counter means 26 set to zero reading, whereupon the blind counter 88 will also be in a zero position with the recesses 112 of the counter disks in alignment and the forwardly directing shoulders 114 thereof engaging the driving pawls 80 of the cage 59.

Upon rotating shaft 46 to rotate the operating shaft 28 in a forward direction—that is, into the plane of the paper, the lowest order wheel 32 of counter 24 will begin to rotate therewith, and simultaneously the blind counter 88, being restrained against counting operation by the pawls 80, will rotate as a unit, driving or carrying the pawls therewith and thus driving the cage 59 in a forward direction. Inasmuch as the cage 59 is secured to the hub of the lowest order wheel 52 of the totalizing counter 26, the lowest order wheel will rotate simultaneously therewith and in synchronism with the lowest order wheel of the indicator 24, and both the indicator and counter will carry like registrations. This synchronous operation will continue as long as the shaft 28 continues to rotate in a forward direction. However, if the forward operation is stopped and operating shaft 28 is moved in a reverse direction, the lowest order wheel 32 of indicator 24 will reverse its travel and begin to decrease the count of indicator 24. The cage 59, however, will be restrained against rotation in a reverse direction by the non-back-up pawls 71, and the lowest order counting disk of the blind counter 88 will begin to rotate in a reverse direction simultaneously with shaft 28, whereupon the driving pawl 76 associated with the lowest counter unit will be cammed outwardly and onto the outer periphery of the counter disk 92 and the driving connection between the counter and cage will be broken.

Inasmuch as all the driving pawls 76 are keyed to shaft 72, they will all be released upon the release of the one associated with the lowest counting order unit, and simultaneously therewith the cage restraining pawls 130 will be moved into engagement with the ratchets 136 to further hold the cage in stationary position. Upon the completion of the reverse movement and the resumption of operation of the driving means in a forward direction, the blind counter will rotate in an opposite direction to move the order units back into zero position, and when the recesses 112 and driving shoulders 114 are in alignment, the pawls 76 will again be moved into engagement therewith by the tension of springs 84, and simultaneously the pawl 130 will be moved out of engagement with ratchet 136, whereupon the cage 59 will again be driven from the drive means.

Inasmuch as the order units of the blind counter are equal in number and construction to the indicator 24, it will be seen that upon reversal of the indicator 24, the blind counter, being in zero position, will add an equal number to that which indicator 24 subtracts, and, upon the indicator 24 again being moved in a forward direction, the blind counter will subtract the number previously added, and, upon reaching zero, will again connect the totalizing counter 26 to the shaft, with the readings of indicator 24 and the totalizing counter 26 equalized.

Although the invention has been described for use with oil drills, it is apparent that the register could be utilized for many other purposes. It is also apparent that the utilization of a counter for making and breaking a driving connection between drive means and driven means could be utilized for other purposes than that shown.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

I claim as my invention:

1. In a register, rotatable operating means adapted to rotate in forward and reverse directions, a totalizing counter, blind counter means connecting the totalizing counter to said operating means for movement in a forward direction and disconnecting said totalizing means when said operating means moves in a reverse direction, means positively restraining said totalizing counter against reverse movement, and means actuated by the blind counter for restraining said totalizing counter means against forward movement as said operating means returns through the distance of travel equal to the extent of reverse movement.

2. In a register, operating means rotatable in forward and reverse directions, a totalizing counter, means restraining movement of said counter in a reverse direction, means operatively connecting said totalizing counter to said operating means for movement in a forward direction, means for automatically disconnecting said operatively connecting means upon reverse movement of said operating means and again connecting it upon a forward movement of the operating means equal in extent to the reverse movement, and means operated by said automatic means to restrain forward movement of said totalizing counter when said totalizing counter is disconnected from said operating means.

3. In a register, rotatable operating means adapted to rotate in forward and reverse directions, a totalizing counter comprising a plurality of rotatable numeral wheels, a blind counter comprising a plurality of rotatable order units interposed between said operating means and said totalizing counter and adapted to count to the extent of the reverse rotation of said operating means and then to an extent of forward rotation equal to the extent of reverse rotation, and cooperative interengaging means between the blind counter and said totalizing counter for rendering said blind counter inoperative as a counter and rendering it operative as a fixed connection between said operating member and said totalizing counter when said blind counter is rotated to an extent of forward rotation equal to the extent of reverse rotation, said interengaging means including a driven member connected to said totalizing counter and means on each rotatable order unit of said blind counter having driving engagement with said driven member while said blind counter is operative as a fixed connection.

4. In a register, operating means adapted to move in forward and reverse directions, a totalizing counter, a blind counter interposed between said operating member and said totalizing counter, means connecting said blind counter to said operating means whereby said blind counter operates as a counter upon reverse movement of said operating means and upon forward movement equal to the extent of reverse movement, and means for then connecting said blind counter to said totalizing counter and including a plurality of pawls connected for unitary movement, means operatively connecting said pawls to the totalizing counter, said blind counter including means for engaging said pawls when said blind counter has moved to an extent of forward movement equal to the extent of reverse movement to thereby render said blind counter inoperative as a counter and rendering it operative as a fixed connection between said operating means and totalizing counter.

5. In a register, operating means adapted to move in forward and reverse directions, a blind counter operatively connected to said operating means and comprising a plurality of operatively connected order units, each of said order units having a forwardly directing shoulder movable into alignment when said operating means move in a forward direction an extent equal to the last reverse movement, and out of alignment when said drive means moves in a reverse direction, a totalizing counter, driven means interposed between said blind counter and said totalizing counter, and means connecting said driven means to said blind counter and comprising a plurality of driving pawls connected for unitary movement and carried by the driven means and engaged by said order unit shoulders when said shoulders are in alignment.

6. In a register, operating means adapted to move in forward and reverse directions, a blind counter operatively connected to said operating means and comprising a plurality of operatively connected order units, each of said order units having a forwardly directed shoulder adapted to be moved into alignment when said operating means moves in a forward direction equal in extent to the last reverse movement, and out of alignment when said operating means moves in a reverse direction, a totalizing counter, driven means interposed between said blind counter and said totalizing counter, means connecting said driven means to said blind counter and comprising a plurality of driving pawls connected for unitary movement and carried by said driven means and engaged by said order unit shoulders when said shoulders are in alignment to thereby connect the totalizing counter to the blind counter, means on said blind counter order units for disconnecting said pawls when the blind counter is operated by the operating means operating in a reverse direction, and means operative by the disengagement of said pawls for restraining said driven means against rotation in a forward direction when disconnected from said blind counter.

7. In a register, a rotatable operating shaft, a blind counter concentrically mounted thereon and comprising a plurality of operatively connected order units, each of said order units including a disk provided with a forwardly facing shoulder and a recess adjacent said shoulder, means connecting said lowest order unit to said operating means, whereby said shoulders will be moved out of alignment upon reverse operation of said operating means and into alignment upon forward operation of said operating means equal in extent to the last reverse operation, driven means concentrically mounted on said shaft, a plurality of pawls connected for unitary movement and mounted on said driven means, means normally urging said pawls into engagement with the periphery of said order unit disks, whereby said pawls will engage said shoulders when said shoulders are moved into alignment, and be disengaged therefrom when said shoulders are moved out of alignment, a totalizing counter concentrically mounted on said shaft and comprising a plurality of operatively connected counter wheels, and means operatively connecting said driven means to the lowest order counter wheel of said totalizing counter.

8. In a register, an operating shaft adapted to be rotated in forward and reverse directions, a blind counter concentrically mounted on said operating shaft and comprising a plurality of operatively connected order units, means connecting the lowest order unit to the operating shaft, each of said order units including a counter disk having a recess and a forwardly directing shoulder, driven means comprising a pair of spaced circular side members concentrically mounted on said operating shaft, a plurality of pawls carried by said driven means and off-set from the center thereof, said pawls being connected for unitary movement, means urging said pawls into said counter disk recesses and into engagement with said shoulders when all of said shoulders are in alignment, whereby rotation of said operating means in a forward direction will cause simultaneous rotation of said blind counter and driven means as a unit, means restraining said driven means against operation in a reverse direction, a totalizing counter concentrically mounted on said operating shaft and comprising a plurality of operatively connected counter wheels, and means connecting the lowest order counting wheel of said totalizing counter to said driven means.

9. In a register, an operating shaft adapted to be rotated in forward and reverse directions, a blind counter concentrically mounted on said operating shaft and comprising a plurality of order units, transfer means connecting said order units for progressive step by step operation, rotatable means concentric with the blind counter supporting said transfer means, means interconnecting said rotatable means to said order units for simultaneous rotation as a unit including inter-engaging means carried by said order units and the rotatable means and engageable when said shaft moves in a forward direction equal in extent to the last reverse movement and disengageable when the shaft moves in a reverse direction, means restraining said rotatable means against movement in a reverse direction, means connecting said lowest order unit to said shaft for simultaneous rotation therewith, whereby upon reverse operation of said shaft said blind counter will operate said interconnecting means to disconnect said blind counter and rotatable means and maintain same disconnected until said shaft is moved through a forward direction of equal extent to the reverse direction, means operative upon disconnection of said counter from said rotatable means to restrain said rotatable means against movement in a forward direction until said counter and rotatable means are again connected, a totalizing counter comprising a plurality of operatively connected counter wheels concentrically mounted on said shaft, and means connecting the lowest order counter wheel of said totalizing counter to said rotatable means.

10. In a register, operating means adapted to move in forward and reverse directions, a blind counter comprising a plurality of operatively connected order units, driven means, cooperating means carried by said driven means and each of said order units and simultaneously engageable upon movement of said units in a forward direction equal in extent to the last reverse movement, means on each of said order units operative upon reverse movement of said units to disconnect said cooperating means, and means operative upon disconnection of said cooperating means for restraining said driven means against movement in a forward direction following a reverse movement until said connecting means again engage said blind counter units.

11. In a register, operating means adapted to move in forward and reverse directions, a totalizing counter, a blind counter having a plurality of operatively connected order units, means connecting said lowest order unit of said blind counter to said operating means, each of said blind counter order units having a forwardly facing shoulder movable into alignment when said driving means moves in a forward direction equal in extent to the last reverse direction and out of alignment when said driving means moves in a reverse direction, and an operative connection between said totalizing counter and said blind counter including a plurality of pawls connected for unitary movement and engaging said blind counter order unit shoulders when said blind counter units are in alignment, whereby said totalizing counter will be operatively connected to said blind counter.

WILLIAM L. TANCRED.